(12) United States Patent
Ezell et al.

(10) Patent No.: US 8,938,545 B2
(45) Date of Patent: Jan. 20, 2015

(54) SIP TRANSFER IN A BACK-TO-BACK USER AGENT (B2BUA) ENVIRONMENT

(75) Inventors: Joel Ezell, Broomfield, CO (US); Gordon R. Brunson, Broomfield, CO (US); Chandra Mouli Ravipati, Thornton, CO (US); Harsh V. Mendiratta, East Brunswick, NJ (US)

(73) Assignee: Avaya Inc., Basking Ridge, NJ (US)

( * ) Notice: Subject to any disclaimer, the term of this patent is extended or adjusted under 35 U.S.C. 154(b) by 284 days.

(21) Appl. No.: 13/485,604

(22) Filed: May 31, 2012

(65) Prior Publication Data

US 2013/0173812 A1    Jul. 4, 2013

Related U.S. Application Data

(60) Provisional application No. 61/582,176, filed on Dec. 30, 2011.

(51) Int. Cl.
*G06F 15/16* (2006.01)

(52) U.S. Cl.
USPC ........................................... 709/228

(58) Field of Classification Search
USPC ........................................... 709/228
See application file for complete search history.

(56) References Cited

U.S. PATENT DOCUMENTS

| | | | | |
|---|---|---|---|---|
| 2006/0294245 A1* | 12/2006 | Raguparan et al. | ........... | 709/227 |
| 2007/0276947 A1* | 11/2007 | Panattu et al. | ................ | 709/227 |
| 2008/0126541 A1* | 5/2008 | Rosenberg et al. | ........... | 709/225 |
| 2009/0210538 A1 | 8/2009 | Allen et al. | | |

FOREIGN PATENT DOCUMENTS

| | | |
|---|---|---|
| EP | 2299646 | 3/2011 |
| WO | WO/2009105476 A1 | 8/2009 |

OTHER PUBLICATIONS

Official Action with English Translation for Korea Patent Application No. 2012-0108357, mailed Jan. 20, 2014 7 pages.
RFC 3261, Engineering Task Force (IETF) Network Working Group, 2002.
RFC 5589, Engineering Task Force (IETF) Network Working Group, 2009.
Extended European Search Report for European Patent Application No. 12186047.2 dated Apr. 24, 2013, 10 pages.
Boulton et al., "An Extension to the Session Initiation Protocol (SIP) for Endpoint Session View," Internet Engineering Task Force, Mar. 26, 2009, 24 pages.
Worley, "Interoperation of 'Application Server' B2BUAs with SIP Call Control," Internet Engineering Task Force, Jan. 23, 2010, 16 pages.

* cited by examiner

*Primary Examiner* — Tu Nguyen
(74) *Attorney, Agent, or Firm* — Sheridan Ross P.C.

(57) ABSTRACT

The system generates a change in the SIP INVITE message during a call transfer. Here, a user relation element involved in the call can change the header information in the message to include the endpoint view of the transferring party. Thus, the INVITE message is redirected to the transferring party's user relation element, which can interpret the received message and "unravel" the B2BUAs in the existing call path. The system includes changes in the user relation element to effect the message change and interpret the message once received. Changes to the user relation element forgo the need to change the communication endpoints.

21 Claims, 9 Drawing Sheets

SIP TRANSFER IN A BACK-TO-BACK USER AGENT (B2BUA) ENVIRONMENT

BACKGROUND

Generally, digital calling systems allow users or system administrators to include applications in communications sessions. These applications can complete various tasks, for example, record the call, obtain information, provide caller information, etc. In some communication systems, the applications may be sequenced, which typically requires the applications to be placed "back-to-back" in the call topology. As such, communications in the call, including the call data and administration messages, are sent through each application in sequence. In many instances, the applications in the sequence are referred to as Back-to-Back User Agents (B2BUAs).

Unfortunately, there are problems with utilizing B2BUAs. In a call with three or more communication endpoints and during a call transfer, the B2BUAs involved in a call transfer can render the transfer call flows, described in Request for Comment (RFC) 5589, inoperable. The Session Initiation Protocol (SIP) standards commonly expect complete visibility of the dialog information from endpoint to endpoint. Many complex call features, like call transfer, rely on the visibility of the dialog information. Unfortunately, the B2BUAs break the call flows that are based on the assumption that the dialog information is visible. For example, the B2BUAs may change the Contact Uniform Resource Identifier (URI) and dialog IDs on messages before sending them to the next B2BUA or other system component. This behavior renders the Refer-To: URI/dialog ID unusuable by a transferred endpoint.

While it is true that the far-end identity information is maintained in the Request URI, To, P-Asserted-Identity, and From headers of the original INVITE message, these headers are not sufficient to address a particular device. RFC 5589 dictates that transfers utilize the Contact URI and the primary dialog ID. Because this information is altered by the B2BUAs, transfers become problematic.

Prior solutions attempt to have a primary B2BUA (sometimes referred to as a call manager) intercept the REFER and effect the transfer itself by Re-INVITING the transferred/transfer target UAs so they end up talking to each other. This has the unfortunate side effects of: leaving sequenced B2BUAs for the transferring party in the signaling path after that transferring party has dropped from the call; and obscuring the transfer call flow from other sequenced B2BUAs, such that it is not easy to discern that a transfer has occurred.

SUMMARY

It is with respect to the above issues and other problems that the embodiments presented herein were contemplated. The system, in some embodiments, includes a change in the INVITE message during a transfer. Here, a user relation element involved in the call can change the header information in the message to include the endpoint view of the transferring party. Thus, the INVITE message is redirected to the transferring party's user relation element, which can interpret the received message and "unravel" the B2BUAs in the existing call path (e.g., the call path established before a transfer is requested). The system includes changes in the user relation element to effect the message change and interpret the message once received. Changes to the user relation element forego the need to change the endpoint UAs.

In embodiments, the system allows standard UAs to participate in a call flow according to standards defined in RFC 5589 by having the proxy/registrar/location server/feature sequencer (referred to as a "user relation element") put a uniform resource identifier (URI) parameter in the Contact URI. The URI parameter in the Contact URI ensures that the contact address captures the handle of the peer user even if the request has traversed across B2BUAs. This parameter is then used by the user relation element to appropriately sequence B2BUAs on the INVITE-Replaces and deliver the INVITE-Replaces to the correct transfer target UA.

Specifically, the user relation element can implement one or more of the following rules: 1) On receipt of a request or response from a UA, create a unique identifier (which can include an address of record (AOR)-based Globally Routable UA URI (GRUU) or its equivalent), however creating the AOR-GRUU will not be necessary if the endpoint Contact URI was already an AOR-based GRUU; 2) create an Endpoint-View (epv) header including AOR-based GRUU, Call-ID, and local/remote tag; 3) check if the host portion of the Contact URI matches a registered contact for a user; 4) if there is a match (indicating that the request or response is being delivered to the far-end UA), put the information from the epv header into an epv parameter on the Contact URI; and 5) complete these tasks in a stateless environment, with the exception of the registered contact database which already exists.

Unbeknownst to the transferring and transferred UA, the Refer-To URI then includes the epv parameter, and it is similarly included as a URI parameter on the ensuing INVITE-Replaces. The epv parameter can then be used to accurately sequence applications during transfers (use of INVITE-Replaces). Now sequenced B2BUAs for the transferring party can be removed from the signaling path after the transferring party has dropped the call. It also becomes much easier to discern when a transfer occurs.

The term "user agent" or "UA" as used herein can refer to any hardware and/or software that executes client applications implementing a function or feature in a communication session. The user agent can be one or multiple communication endpoints associated with or capable of establishing a communication session.

The term "user relation element" or "URE" as used herein can refer to any hardware and/or software, device, application, or infrastructure, creating the on-demand access to services and applications. The user relation element can instantiate instances of applications for users that can be applied to sessions to and from UAs. The user relation element provides the capability to create a profile for third party users and add applications to be applied to the users to do things such as blocking calls based on user preferences, directing calls to users when they move across the enterprise, and augmenting caller identification information for incoming and outgoing calls. In embodiments, the URE is the entity that initially sequences applications on behalf of or according to preferences that are user defined and/or administratively defined.

The term "call manager" as used herein can refer to any hardware and/or software, device, application, or infrastructure operable to help establish communication sessions between two or more communication endpoints. In embodiments, the call manager is another B2BUA.

The term "Globally Routable UA URI (GRUU)" as used herein can refer to any unique identifier (e.g., URI) which can be used by any component of a system to route a call to a specific UA.

The term "address of record (AOR)" as used herein can refer to any address that can be used to map or direct a call to a specific user or component of the system. Thus, the AOR can be the "public address" of the user or component. A single AOR can be associated with multiple UAs. In general, the AOR identifies a user and the GRUU identifies a device for that user.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the embodiments are considered to include a tangible storage medium and prior art-recognized equivalents and successor media, in which the software implementations of the present embodiments are stored.

The term "communication session" as used herein refers to any communication or set of communications between communication devices, whether including audio, video, text, or other multimedia data. Typically, a communication session includes two or more communication endpoints, UAs, and/or one or more communication servers (e.g., a SIP server).

The term "communication device" or "communication endpoint" as used herein refers to any hardware device and/or software operable to engage in a communication session. For example, a communication device can be an IP-enabled phone, a desktop phone, a cellular phone, a personal digital assistant, a soft-client telephone program executing on a computer system, etc. In embodiments, the communication endpoint is a computer system as described in conjunction with FIGS. 5 and 6.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other documents describing SIP are hereby incorporated by reference in their entirety for all that they teach.

The term "network" as used herein refers to a system used by a communication platform to provide communications between communication endpoints. The network can consist of one or more user relation elements, feature servers, communication endpoints, etc. that allow communications, whether voice or data, between two users. A network can be any network or communication system as described in conjunction with FIGS. 6 and 7. Generally, a network can be a local area network (LAN), a wide area network (WAN), a wireless LAN, a wireless WAN, the Internet, etc. that receives and transmits messages or data between devices to facilitate communication platform activities. A network may communicate in any format or protocol known in the art, such as, transmission control protocol/internet protocol (TCP/IP), 802.11g, 802.11n, Bluetooth, or other formats or protocols.

The term "database," "archive," or "data structure" as used herein refers to any system, hardware, software, memory, storage device, firmware, component, etc., that stores data. The data model can be any type of database or storage framework described in conjunction with FIGS. 6 and 7, which is stored on any type of non-transitory, tangible computer readable medium. A database can include one or more data structures, which may comprise one or more sections or portions that store an item of data. A section may include, depending on the type of data structure, an attribute of an object, a data field, or other types of sections included in one or more types of data structures. The data structure can represent a text string or be a component of any type of database, for example, relational databases, flat file databases, object-oriented databases, or other types of databases. Further, the data structures can be stored in memory or memory structures that may be used in either run-time applications or in initializing a communication.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "module" refers to any known or later developed hardware, software, firmware, artificial intelligence, fuzzy logic, or combination of hardware and software that is capable of performing the functionality associated with that element. Also, while the various concepts are described in terms of exemplary embodiments, it should be appreciated that aspects can be separately claimed.

Hereinafter, "in communication" shall mean any electrical connection, whether wireless or wired, that allows two or more systems, components, modules, devices, etc. to exchange data, signals, or other information using any protocol or format.

The preceding is a simplified summary to provide an understanding of some aspects of the embodiments. This summary is neither an extensive nor exhaustive overview of the various embodiments. It is intended neither to identify key or critical elements nor to delineate the scope of the embodiments but to present selected concepts in a simplified form as an introduction to the more detailed description presented below. As will be appreciated, other embodiments are possible utilizing, alone or in combination, one or more of the features set forth above or described in detail below.

BRIEF DESCRIPTION OF THE DRAWINGS

The present disclosure is described in conjunction with the appended Figs..

In the appended Figs., similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the embodiments. Rather, the ensuing description will provide those skilled in the art with an enabling description for implementing the embodiments. Various changes may be made in the function and arrangement of elements without departing from the spirit and scope of the embodiments as set forth in the appended claims.

Figure 1A:
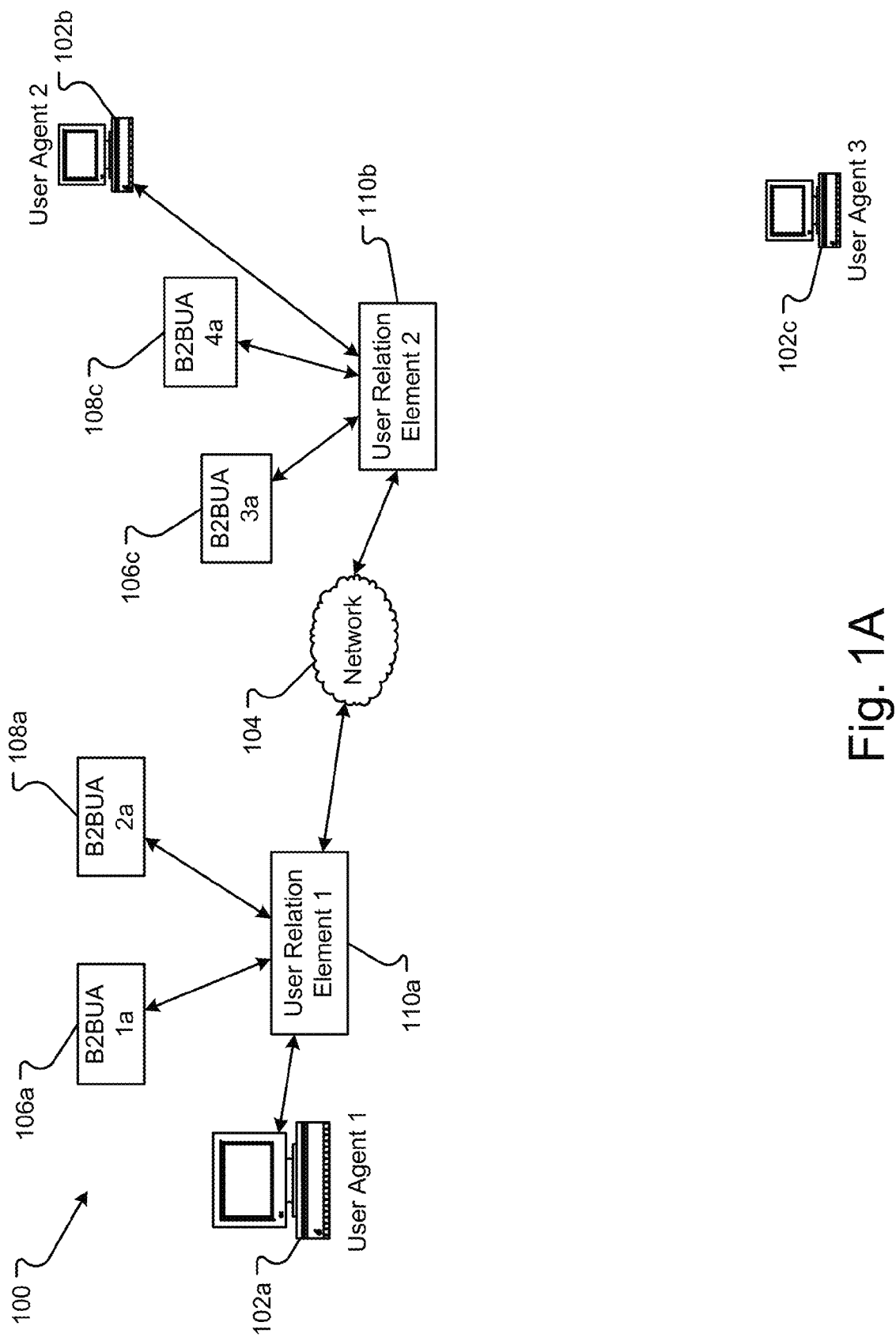
FIGS. 1A-1C are block diagrams of embodiments of a system for transferring a communication session between UAs.
Figure 1B:
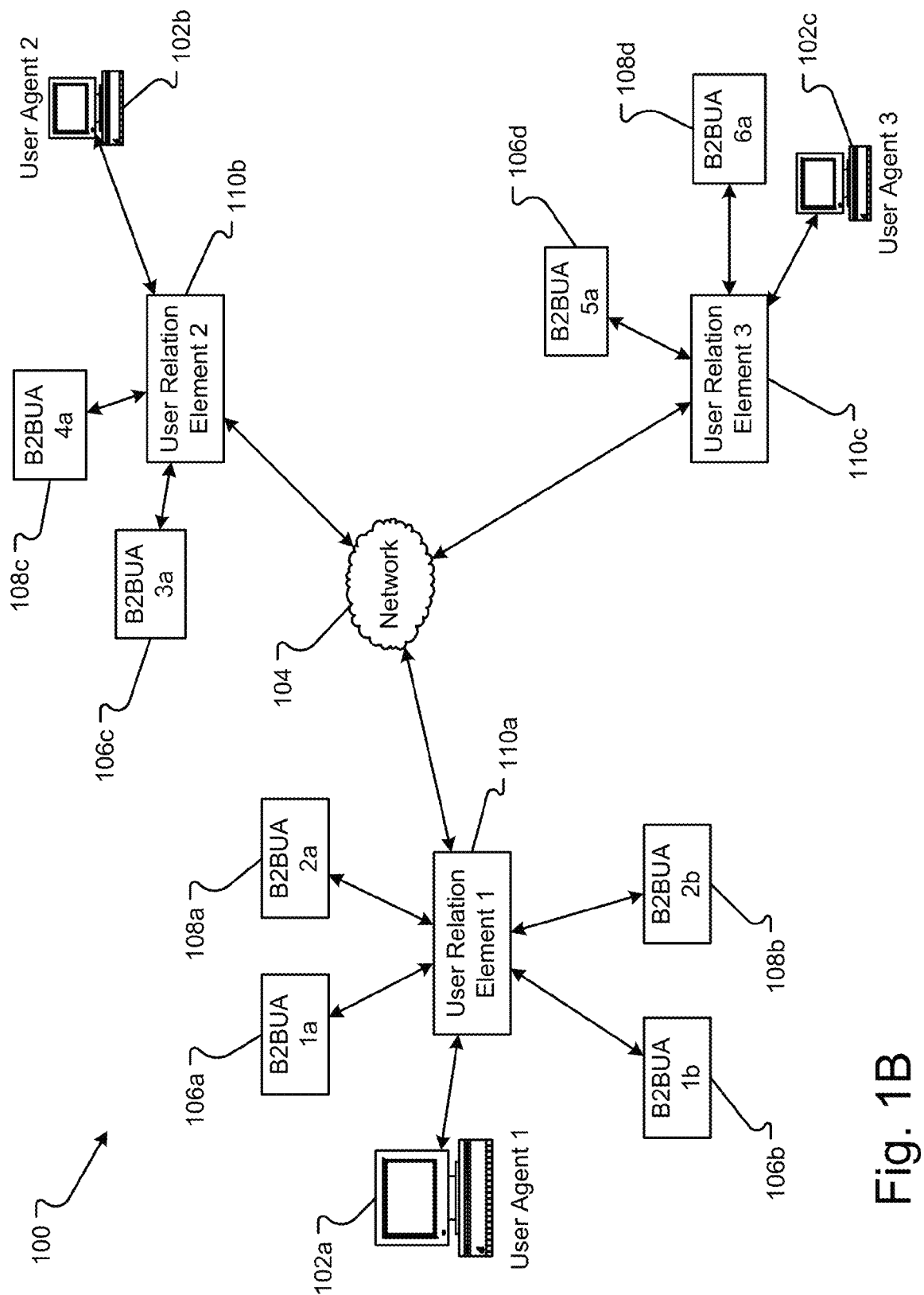
Figure 1C:
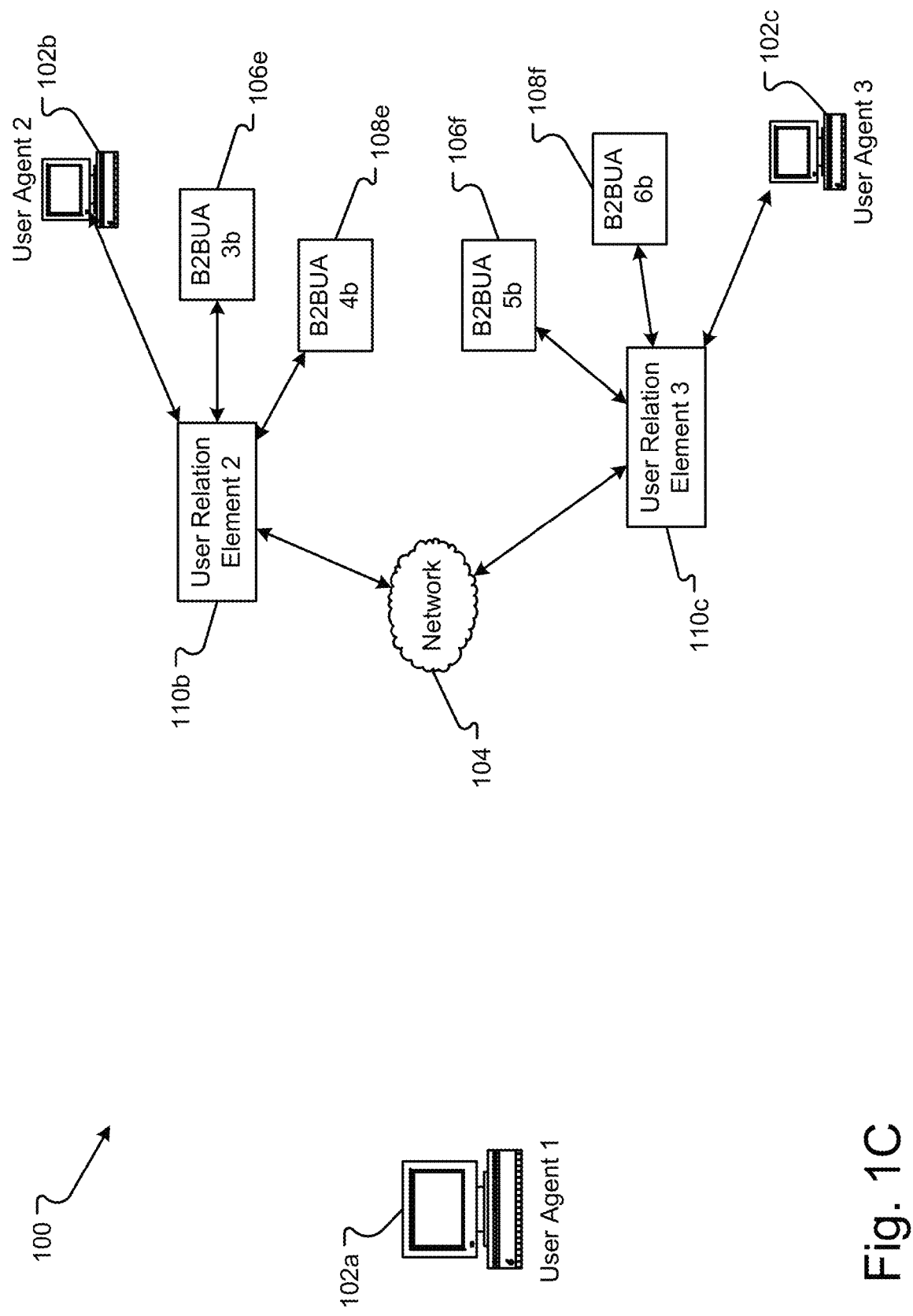

A call environment 100 is shown in FIGS. 1A through 1C. The call environment 100 can include one or more components in communication with each other. In embodiments, the call environment 100 includes at least two UAs 102a, 102b, and/or 102c in communication with each other during a communication session. A communication session can include a voice call, a video call, or other exchange of real-time or near-real-time communications in any type of medium or combination of media. The communication sessions can be conducted over any network 104 or system, such as, a wide area network (WAN), a local area network (LAN), or other system, which are all represented by network 104. In embodiments, the communication session is conducted using digital transmissions wherein at least some of the digital transmissions are control signals for executing or establishing the call. The control signals may be sent under one or more protocols, for example, SIP.

The call environment 100 can include two or more UAs 102a, 102b and/or 102c. When a communication session is created, UAs 102a, 102b, and/or 102c may have applications that are included in the communication session according to preferences. Applications can include specific call features that are executed by B2BUAs 106 or 108 in a communication path between the UAs 102a, 102b, and/or 102c. The applications can also include a call manager, which may provide functionality in establishing a communication session and sequencing applications for inclusion in the communication session. A B2BUA 106/108 may be an application or software module operable to conduct a function or feature for the user of the UA 102. For example, a B2BUA 106/108 may complete such functions as recording the media of the communication session, extracting metadata from the communication session, or other functions. The B2BUAs 106/108 are operable to be invoked and established in sequence and in-line with the communication path of the communication session. Thus, when a communication session is created, a user relation element 110 can invoke or instantiate instances of the B2BUAs 106 and 108 in sequence such that any communications data received from another UA 102 is sent or routed through that UA's B2BUAs 106/108. Thus, all B2BUAs 106/108 are in-line and back-to-back in the signaling path of the communication session.

A user relation element 110 can be a software function executed by a processor on a server. In embodiments, the user relation element 110 can be an Internet Protocol (IP) Multimedia Subsystem (IMS) Serving-Call Session Control Function (S-CSCF)/Smart Common Input Method (SCIM) function. The user relation element 110 is operable to establish and conduct communication sessions amongst and for one or more UAs 102. For example, user relation element 1, 110a can establish and conduct communication sessions for UA 1, 102a. Likewise, user relation element 2, 110b can establish and conduct communication sessions for UA 2, 102b. In alternative embodiments, user relation element 1, 110a and user relation 2, 110b are the same instance of the user relation element 110 and can conduct the communication session for both UAs 102. The user relation element 110 is operable to control and conduct communication sessions by establishing B2BUAs 106/108 and connecting the sequence of the B2BUAs 106/108 between UAs 102 involved in a communication session.

In FIG. 1A, UA 1, 102a has established a communication session with UA 2, 102b. As such, B2BUA 1a, 106a; B2BUA 2a, 108a have been sequenced for the UA 1, 102a. As can be seen in FIG. 1A, B2BUAs are in-line and connected in sequence between the network 104 and the UA 1, 102a. Likewise, B2BUA 3a, 106c; B2BUA 4a, 108c have been invoked and established in-line and in sequence for UA 2, 102b by the user relation element 2, 110b. The communication session shown in FIG. 1A shows a point-to-point communication session between UA 1, 102a and UA 2, 102b.

UA 1, 102a can initiate establishment of the first communication session with UA 2, 102b, as shown in FIG. 1A or UA 2, 102b may be the initiating UA. In FIG. 1B, UA 1, 102a establishes a second communication session with UA 3, 102c. Again, either UA 1, 102a or UA 3, 102c may correspond to the initiating UA. In the depicted example, new instantiations of the B2BUAs 108b and 106b are created for the UA 1, 102a. Of course, it may also be possible to leverage B2BUA 1a, 106a and/or B2BUA 2a, 108a for the second communication session rather than involving new B2BUAs 106b and 108b. It may also be possible that all UAs involved in any communication session described herein may be served by the same user relation element 110 and, possibly, the same B2BUAs.

On the opposite side of the communication session, user relation element 3, 110c establishes B2BUA 5a, 106d and B2BUA 6a, 108d for UA 3, 102c. Thus, as shown in FIG. 1B, UA 1, 102a is simultaneously involved in two communication sessions, one with UA 2, 102b and one with the UA 3, 102c.

Referring now to FIG. 1C, UA 1, 102a has completed a transfer, thereby establishing a third communication session between UA 2, 102b and UA 3, 102c. In the third communication session, UA 1, 102a has discontinued both the first and second communication sessions and the third communication session involving UA 2, 102b and UA 3, 102c causes the UAs to be placed in a point-to-point and direct communication. The establishment of the third communication session can be completed in a number of ways. In the example that will be described below, the establishment of the third communication session occurs with the UA 1, 102a acting as a transferring entity, UA 2, 102b acting as a transferred entity, and UA 3, 102c acting as the target of the transfer by UA 1, 102a. It should be appreciated, however, that UA 2, 102b may actually be the target of the transfer and UA 3, 102c may be the transferred entity. The steps and uniqueness of how these different communication sessions are established and how the entities are transferred is discussed in conjunction with FIGS. 4a and 4B.

Figure 2:
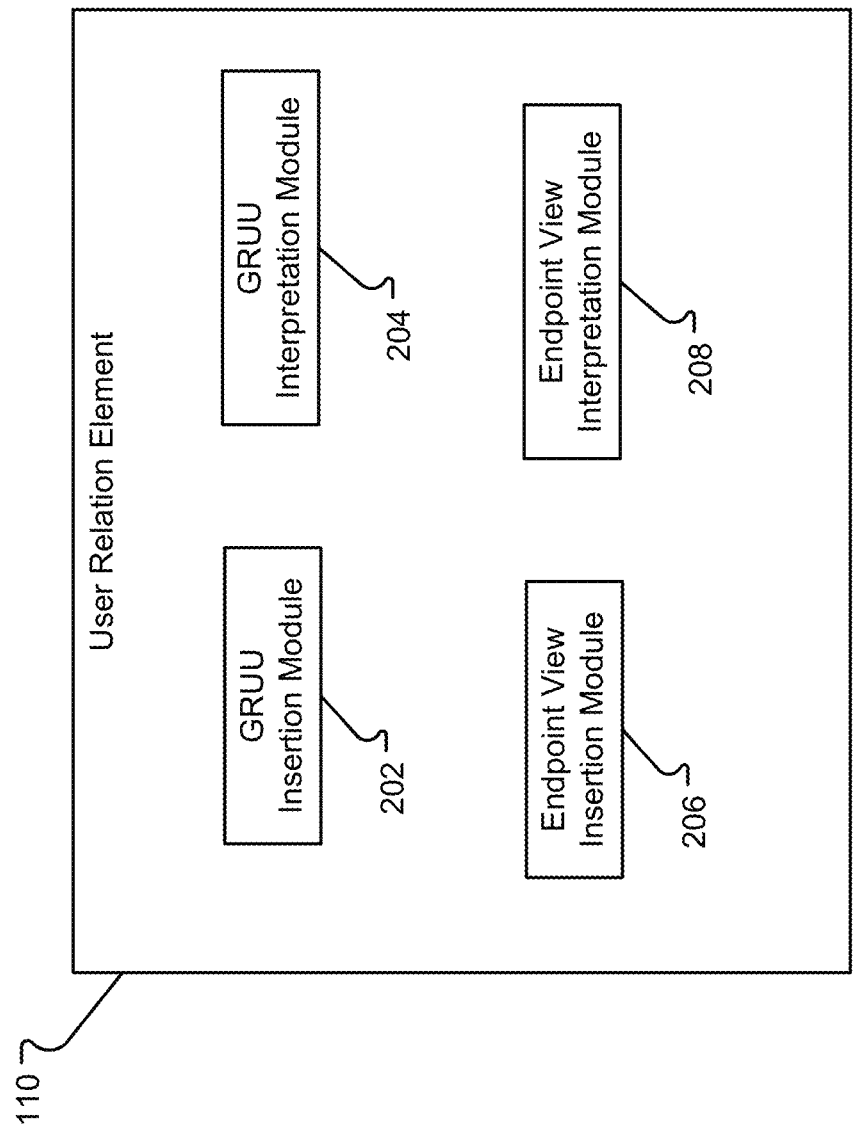
FIG. 2 is a block diagram of an embodiment of a user relation element.

An embodiment of a user relation element 110 is shown in FIG. 2. User relation element 110 may be any type of hardware and/or software operable to establish or manage communication sessions for UAs 102. In embodiments, the user relation element 110 includes one or more software modules. These software modules may include a GRUU insertion module 202, a GRUU interpretation module 204, an endpoint view insertion module 206, and/or an endpoint view interpretation module 208. The GRUU insertion module 202 is operable to insert the GRUU or AOR into a SIP message depending on predetermined triggers, such as the type of message or previous messages. For example, if the message is a transfer from one caller to another, the GRUU insertion module 202 can insert the GRUU or AOR into an appropriate message to affect the transfer of the call, as described in FIG. 3A. Thus, the GRUU insertion module 202 is operable to change SIP messages based on the type of message or other information.

The GRUU interpretation module 204 can interpret the type of message or other information and issue instructions to the GRUU insertion module 202 to change one or more SIP messages. Thus, the GRUU interpretation module 204 may look for certain messages, for example, a SIP INVITE message, and instruct the GRUU insertion module 202 to change information in the INVITE message or in a subsequent message to affect the transfer. The GRUU interpretation module 204 provides a scanning capability to the user relation element 110 to affect the call transfer as described in conjunction with FIGS. 4A and 4B.

Further, the GRUU interpretation module 204 can receive INVITE messages, where the INVITE messages are for a UA 102 not associated with the local user relation element 110. However, the INVITE message may be sent to a B2BUA 106, 108 in a communication path between the local UA and the other UA. The GRUU interpretation module 204 can interpret these received INVITE message to mean to unravel the B2BUA. Thus, the GRUU interpretation module 204 provides an unraveling capability to the user relation element 110 to dismantle or unravel a communication path, as described in conjunction with FIGS. 4A and 4B.

The endpoint view (epv) insertion module 206 is operable to insert the AOR-based GRUU into the endpoint view header of any message, such as SIP messages. For example, if the message is a transfer from one caller to another, the epv insertion module 206 can insert the AOR-based GRUU into an appropriate message, as described in FIG. 3A. Thus, the epv insertion module 206 is operable to change SIP messages based on the type of message or other information.

The epv interpretation module 208 can interpret the type of message or other information and issue instructions to the epv insertion module 206 to change one or more SIP messages. Thus, the epv interpretation module 208 may look for certain messages, for example, a SIP INVITE message, and instruct the epv insertion module 206 to change information in the INVITE message or in a subsequent message to affect the transfer. The epv interpretation module 208 provides a scanning capability to the user relation element 110 to affect the call transfer as described in conjunction with FIGS. 4A and 4B.

Figure 3A:
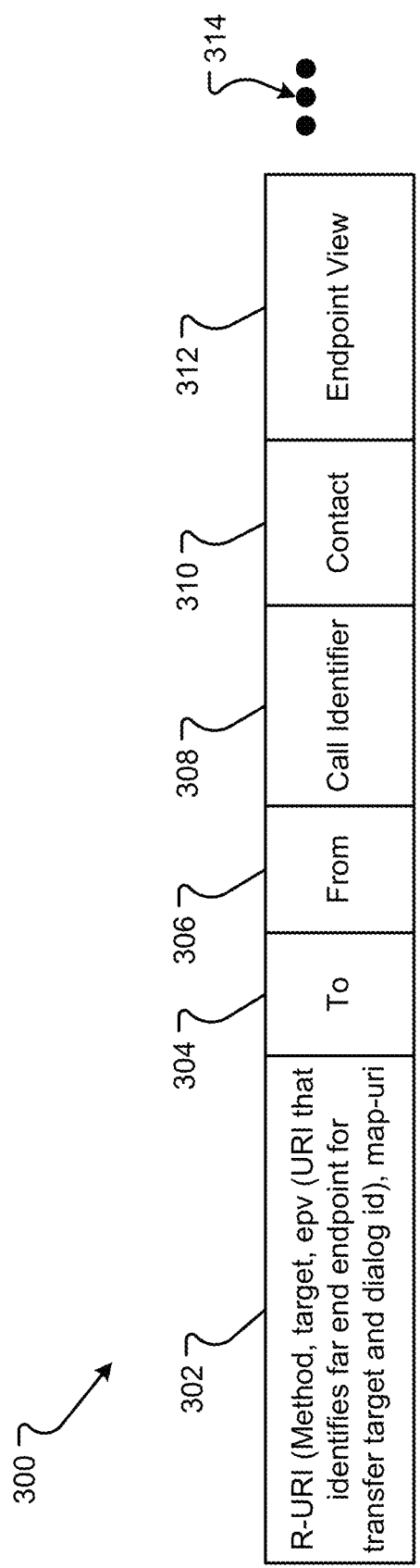
FIGS. 3A and 3B are logical block diagrams of embodiments of a data packet that can affect the transfer of a communication session.
Figure 3B:
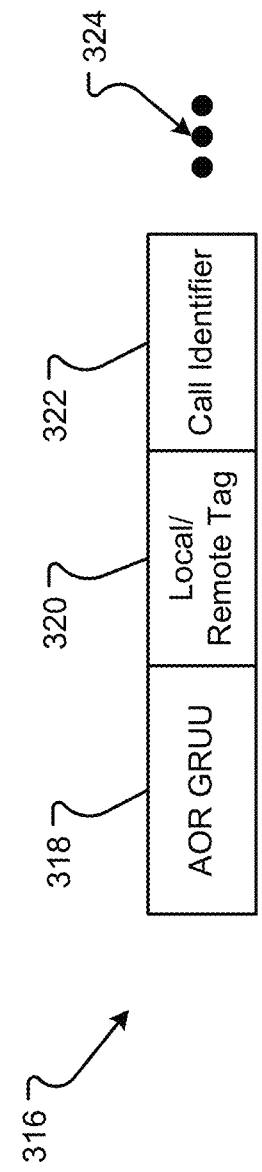

Embodiments of a SIP message 300, as used to conduct different communication sessions in the calling environment 100, are shown in FIGS. 3A and 3B. The SIP messages 300 may include one or more portions, which may be fields or other message components. The SIP message 300 can include more or fewer fields than those shown in FIG. 3A as represented by ellipses 314. In embodiments, the portions of the message 300 can include a Request-URI (R-URI) (which can include one or more of a method, a target, an epv, which may be a URI that identifies a far end endpoint as a transfer target and may also include a dialog identifier, map-URI, etc.) 302, a To field 304, a From field 306, a call identifier field 308, a contact field 310, and an endpoint view field 312. These fields will be described in more detail hereinafter.

The first portion 302 (hereinafter referred to as the R-URI field 302) of the SIP message 300 can include a request line with a SIP method and a Request-URI. A SIP method can include an INVITE command, a REFER message, an ACK message, or other types of SIP messages. The method can indicate the message type of the many SIP messages and include any other data required for the command or message, such as to whom the command is directed. The 200 OK response message is also described herein. In embodiments, an INVITE-replaces message can include, in the R-URI field 302, an endpoint-view (epv) parameter that provides a requester URI with information about the party to which the message is targeted. The R-URI field 302 of the message 300 is interpreted by the GRUU interpretation module 304 to determine whether to adjust the invitee or other designation in the R-URI field 302 of that or another message. An example of such a message is shown below:

```
INVITEsip:Called-User@appW;
   epv="<sip:Called-User@Avaya;gr=1234>"
To: Called-User <sip:Called-User@Avaya;tag=xyz>
From: Calling-User <sip:Calling-User@Avaya;tag=abc>
PAI: Calling-User
Call-ID: AW
Contact: Calling-User <sip:appW@appwIP;
   epv="<sip:Calling-User@Avaya;gr=5678>"
Replaces: BY
Target-Dialog: AW
```

As shown above, the section of the message that includes "INVITEsip:Called-User@appW;    epv="<sip:Called-User@Avaya;gr=1234": is the R-URI field 302. As shown, the method is "INVITE". The target is "Called-User@appW". The epv parameter is "<sip:Called-User@Avaya;gr=1234>". The dialog identifier is "Call-ID: AW." How these fields are used in the communication processing is explained in more detail in conjunction with FIGS. 4a-4B.

It should be noted that the illustrative example of a SIP message above as well as other examples of SIP messages herein show the 'epv' parameter as being in double quotes. It is appreciated, however, that any type of SIP message format is possible without departing from the scope of the present disclosure. For example, in some SIP messages, the 'epv' parameter may be escaped using % hex digits as per RFC 3261. The double quotes presented herein are used to maintain the readability of the message for discussion and illustrative purposes.

The To field 304 can store information about an addressee for the message 300. The To field 304 can include a name of a person or entity, an address, or some other information identifying to which entity the message 300 is being sent. In embodiments, the To field 304 can include an address of record for the destination of the message 300. Likewise, the From field 306 can include information about the entity that has sent the message 300. The From field 306 can include an address of record or other information about the system or person that sent the message 300. The To field 304 and the From field 306 may also comprise tags, which, with the call identifier in the To field and/or From field, comprises the dialog identifier for the communication.

The call identifier field 308, as the name suggests, may include information that identifies one or both parties involved in a communication or a device being used by parties involved in the communication session. In some embodiments, the call identifier field 308 can include information about the two or more parties conducting the communication session or other information that uniquely identifies the call. In embodiments, the call identifier 308 may include information identifying the communication session uniquely in respect to all other communication sessions. Thus, the call identifier 308 can include a globally unique identifier (GUID) or some other numerical, alphabetical, or alphanumerical identifier for the call.

The contact field 310 can include information that describes the communication session. For instance, the contact field 310 can include information about the type of transport, the port address, or other information associated with the communication session. The contact field 310 can be used to determine the identity of the sending device for the message.

The endpoint view field 312 is an added field new to embodiments described herein. The endpoint view field 312 can store information regarding the UA's local view of the session. The endpoint view header 312 can contain a unique identifier (e.g., an AOR-based GRUU or its equivalent) of the original sender of the message, so that this information can be populated in an epv parameter on the Contact URI. For example, in FIG. 1B, the Endpoint View field 312 is used to carry the GRUU of endpoint 102a through to UA 102b (where just before it is delivered to the UA it is populated in an epv parameter on the Contact URI).

The information 316 for the epv field 312 may be as shown in FIG. 3B. The epv information 316 can include more or fewer fields than those shown in FIG. 3B as represented by ellipses 324. The epv field 312 can include an AOR/GRUU 318, a local tag/remote tag 320, and/or a call identifier 322. The AOR/GRUU 318 can include information, such as identification and addressing information, about the UAs 102a/b/c. These UAs 102a/b/c can be included in one or more communication sessions. Thus, the AOR/GRUU 318 provides information for the transfer that allows a call to be set-up, as described in conjunction with FIGS. 4A through 4C. The call identifier 322 can be the same or similar to the call identifier 308 described in conjunction with FIG. 3A. The local tag portion of the local tag/remote tag 320 can include a semi-random, semi-unique identifier created by the local B2BUA for the specific session. The remote tag portion of the local tag/remote tag 320 can include a semi-random semi-unique identifier created by the remote B2BUA for the specific call. The epv field 312 can be used by the GRUU interpretation module 204 to identify when a command invitee in the command field 302 or an entity designated in the To field 304 is to be changed, and the GRUU insertion module 202 can insert the AOR/GRUU from the epv field 312 into the To field 304 or command field 302.

Figure 4A:
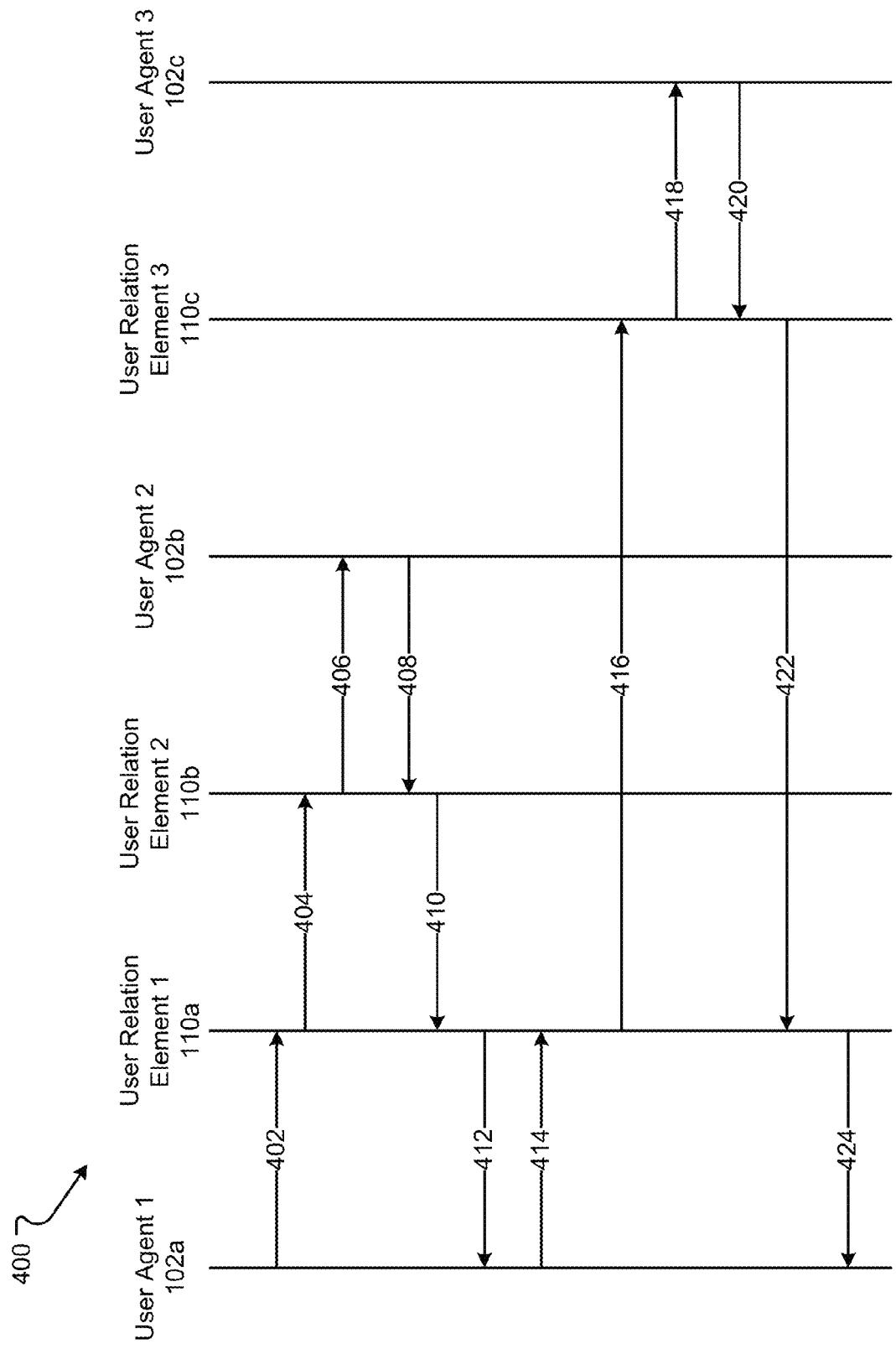
FIGS. 4a and 4B is a flow diagram of an embodiment of a process for transferring a communication session between UAs.
Figure 4B:
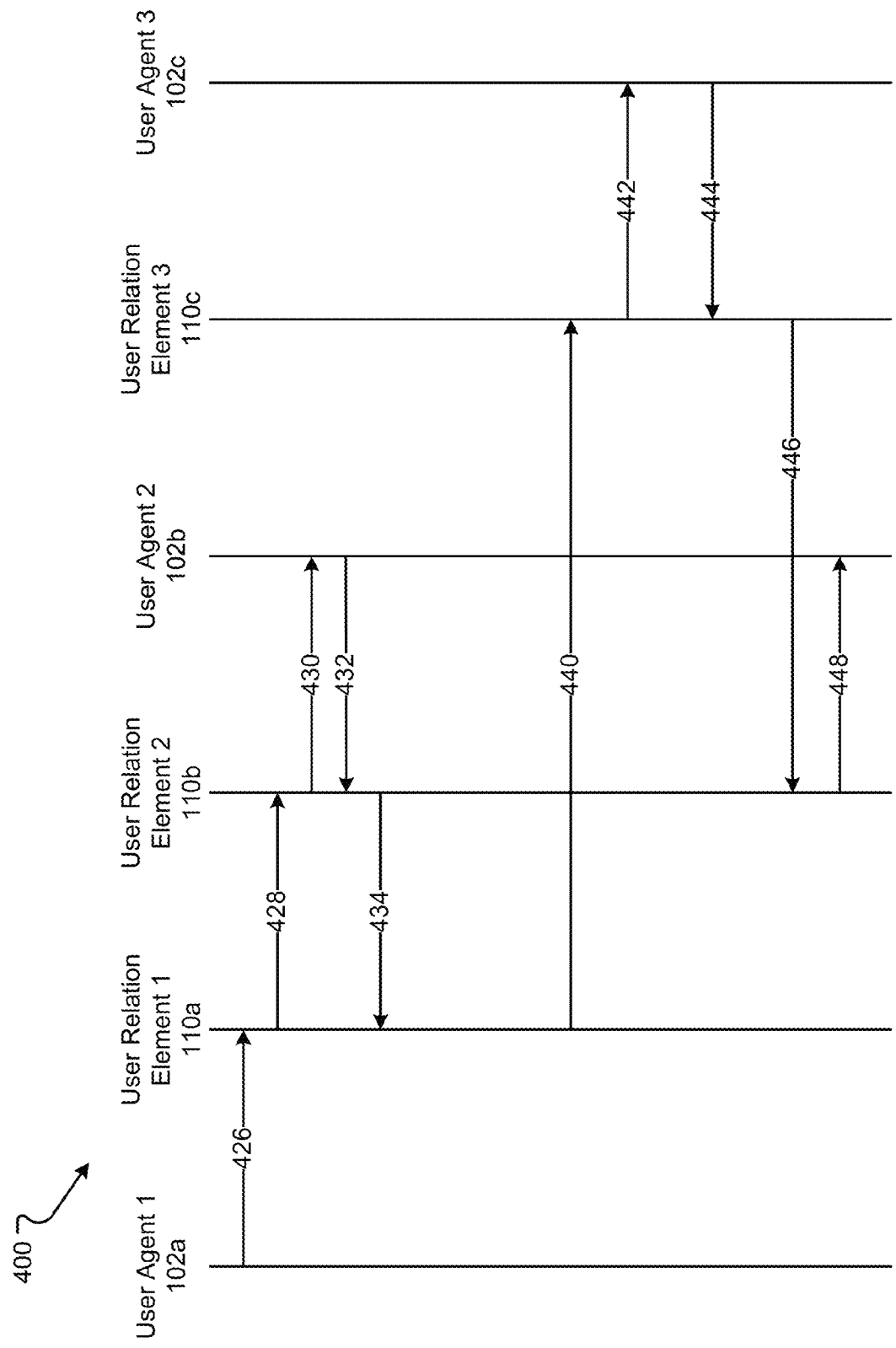

A method for conducting a call transfer is shown in FIGS. 4A and 4B. While a general order for the steps of the method 400 is shown in FIGS. 4A and 4B, it should be appreciated that embodiments contemplate that the steps need not be performed in exactly the order in which they are described and depicted. Generally, the method 400 starts with a start operation and ends with an end operation. The method 400 can include more or fewer steps or can arrange the order of the steps differently than those shown in FIGS. 4A and 4B. The method 400 can be executed as a set of computer-executable instructions executed by a computer system and encoded or stored on a computer readable medium. Hereinafter, the method 400 shall be explained with reference to the systems, components, modules, software, data structures, user interfaces, etc. described in conjunction with FIGS. 1-3.

UA 1, 102a may send the SIP INVITE to the user relation element 1, 110a to begin establishing the call with UA 2, 102b, in step 402. An example of an INVITE message may look like the following (wherein "Alice" is operating UA 1, 102a and "Bob" is operating UA 2, 102b):

```
INVITE sip:Bob@Avaya SIP/2.0
To: Bob <sip:Bob@Avaya>
From: Alice <sip:Alice@Avaya>
Contact: Alice <sip:Alice@aliceIP>
```

At this point, the user relation element 110a that is authoritative for Alice can begin to invoke or sequence the B2BUAs 106a and 108a. Thus, user relation element 110a initiates B2BUA 1a, 106a, by sending the INVITE message (corresponding to a modified version of the original INVITE message transmitted in step 402) to the B2BUA 1a, 106a. An example of the INVITE message sent to the B2BUA 1a, 106a from the user relation element 1, 110a can be modified to look like the following:

```
INVITE sip:Bob@Avaya SIP/2.0
To: Bob <sip:Bob@Avaya>
From: Alice <sip:Alice@Avaya>
Contact: Alice <sip:Alice@aliceIP>
Endpoint-View: <sip:Alice@Avaya;gr=1234>;
    localtag=A;call-id=AW
```

Here, the message is directed to the B2BUA 1a, 106a to invite UA 2, 102b and the epv header includes information about the endpoint view of Alice—"Endpoint-View: sip:Alice@Avaya;gr=1234>; localtag=A;call-id=AW." The epv header includes the GRUU for the UA 1, 102a and the dialog identifier "call-id=AW."

The B2BUA 1a, 106a returns the INVITE message to the user relation element 1, 110a. Then, if additional applications need to be sequenced on behalf of Alice, the user relation element 1, 110a sends the INVITE message to those additional applications (e.g., B2BUA 2a, 108a). After B2BUA 2a, 108a has processed the INVITE message and performed its designated functions, B2BUA 2a, 108a returns the INVITE message to the user relation element 1, 110a. Upon receiving the INVITE message back from B2BUA 2a, 108a, the user relation element 1, 110a may determine that no additional applications need to be sequenced for Alice and based on such a determination send the INVITE message to user relation element 110*b* in step 404

The user relation element 2, 110*b* sequences B2BUAs 106*c*/108*c* for the user associated with the UA 2, 102*b* (e.g., Bob). The manner and order in which applications are sequenced may depend upon preferences defined by Bob or by default/administrator preferences. In some embodiments, user relation element 2, 110*b* sequences B2BUA 3*a*, 106*c* by sending the INVITE message to the B2BUA 3*a*, 106*c*, receiving the INVITE message back from B2BUA 3*a*, 106*c*, and then sending the INVITE message to B2BUA 4*a*, 108*c*. After B2BUA 4*a*, 108*c* has finished processing the INVITE message, the user relation element 2, 110*b* receives the INVITE message back from the B2BUA 4*a*, 108*c* and then delivers the INVITE message to the UA associated with the called party (e.g., UA 2, 102*b*), in step 406.

An example INVITE message delivered to the UA 2, 102*b* may appear as follows:

```
INVITE sip:Bob@Avaya SIP/2.0
Contact: sip:AppX@appxIP;
    epv="<sip:Alice@Avaya;gr=1234>"
    To: Bob <sip:Bob@Avaya>
    From: Alice <sip:Alice@Avaya>
```

Here, "AppX" can be the last B2BUA 4*a*, 108*c* in the set of sequenced applications for the called party (e.g., Bob). It should be noted that the epv header was maintained throughout sequencing by the user relation elements 110 and the information contained within the epv header is delivered to UA 2, 102*b*. Prior to providing the INVITE to UA 2, 102*b*, however, the user relation element 2, 110*b*, may insert information that was maintained in the epv header during message routing into the a parameter on the Contact URI of the INVITE message. Thus, the user relation elements 110 can modify the Contact URI, Call-ID, To, and From tags while maintaining the epv header that was originally created by user relation element 1, 110*a*.

The UA 2, 102*b* can acknowledge receipt of the INVITE request by sending the 200 OK message to the user relation element 2, 100*b*, in step 408. The user relation element 2, 110*b* routes the 200 OK message through B2BUA 4*a*, 108*c* and B2BUA 3*a*, 106*c* then sends it to the user relation element 1, 110*a*, in step 410. An example of the reply message may appear as:

```
200 OK
Contact: Bob <sip:Bob@bobIP>
Endpoint-View:<sip:Bob@Avaya;gr=5678>;
    localtag=B;remotetag=X;call-id=XB
```

Here, the endpoint view of UA 2, 102*b* is included in the epv header, which may remain unchanged through sequencing and delivery to UA 1, 102*a*.

The user relation element 1, 110*a* routes the 200 OK message through B2BUA 2*a*, 108*a* and B2BUA 1*a*, 106*a*. Eventually, the user relation element 1, 110*a* receives the 200 OK message and forwards the 200 OK message to the UA 1, 102*a*, in step 412. In embodiments, the epv parameter is inserted by the user relation element 1, 110*a* in the Contact header of the 200 OK message prior to providing the message to UA 1, 102*a*. A series of SIP ACK messages may then be sent from UA 1, 102*a* to UA 2, 102*b* in similar fashion to the SIP INVITE messages. At this point a first communication session is created between the UA 1, 102*a* and the UA 2, 110*b*, as shown in FIG. 1A.

At some point thereafter the user of UA 1, 102*a* (e.g., Alice) can decide to transfer UA 2, 102*b* to UA 3, 102*c*. This may occur after Alice receives a call from or initiates a call to a user of UA 3, 102*c* (e.g., "Carol"). To accomplish the transfer, UA 1, 102*a* puts UA 2, 102*b* on soft hold. The routing of the hold message to UA 2, 102*b* from UA 1, 102*a* follows a similar procedure as that of the INVITE message/200 OK message/ACK message described above where the hold message follows the Contact/Record-Route headers as an in-dialog message. The routing of the hold message will not be described hereinafter. While the first communication session is on hold, UA 1, 102*a* establishes a new communication session (e.g., a second communication session) with UA 3, 102*c*. The second communication session may be initiated by Alice or Carol. An example of the message to establish the second communication session initiate by Alice may appear as:

```
INVITE sip:Carol@Avaya SIP/2.0
To: Carol <sip:Carol@Avaya>
From: Alice <sip:Alice@Avaya>
Contact: Alice <sip:Alice@aliceIP>
```

As such, the user relation elements 110*a* and 110*c* execute or instantiate B2BUAs 106*b*, 108*b*, 106*d*, and 108*d*. The procedure for establishing the second communication session includes sending an INVITE message from the UA 1, 102*a* to the user relation element 1, 110*a*, in step 414. The user relation element 1, 110*a* then sequences the B2BUAs 106*b* and 108*b*. Then, the user relation element 1, 110*a* sends the INVITE message to user relation element 3, 110*c*, in step 416. In response to receiving the INVITE message, the user relation element 3, 110*c* may sequence B2BUAs 106*d* and 108*d* in accordance with application sequencing preferences defined by or for the user of UA 3, 102*c* (e.g., Carol). Once the appropriate applications have been sequenced as B2BUAs, the INVITE message is forwarded from user relation element 3, 110*c* to the UA 3, 102*c*, in step 418. An example of the INVITE message sent to the UA 3, 102*c* may appear as follows:

```
INVITE sip:Carol@Avaya SIP/2.0
Contact: <sip:AppZ@appzIP;
    epv="<sip:Alice@Avaya;gr=1234>
    ">
    To: Carol <sip:Carol@Avaya>
    From: Alice <sip:Alice@Avaya>
```

As can be seen from the example message, the epv parameter includes information about the endpoint view for UA 1, 102*a*. UA 3, 102*c* then sends the 200 OK message back to user relation element 3, 110*c*, in step 420. The user relation element 3, 110*c* then routes the 200 OK message through the B2BUAs 108*d* and 106*d* and sends it to the user relation element 1, 110*a* in step 422. In step 424, the user relation element 1, 110*a* subsequently sends the 200 OK message, with the epv parameter, to the UA 1, 102*a* via the B2BUAs 108*b* and 106*b*. A series of SIP ACK messages may then be sent back, in a similar fashion, from UA 1, 102*a* to user relation element 1, 110*a* then to user relation element 3, 110*c*, and then to UA 3, 102*c*. At this point, the second communication session is established. After establishing the second communication session, the configuration of the communication environment 100 is as shown in FIG. 1B. Thereinafter the UA 1, 102*a* may send a REFER message that will affect the transfer of Bob to Carol.

The transfer process begins when UA 1, 102*a* sends a REFER message directed to UA 2, 102*b*. The REFER message is first transmitted to user relation element 1, 102*a*-, in step 426. An example of the REFER message may appear as follows:

```
REFERsip:AppW@appwIP;
    epv="<sip:Bob@Avaya;gr=5678>"
To: Bob <sip:Bob@Avaya>
From: Alice <sip:Alice@Avaya>
PAI: Alice
Call-ID: AW
Contact: <Alice <sip:Alice@aliceIP;
    epv="<sip:Alice@Avaya;gr=1234>">
Refer-To:Carol <sip:AppY@appyIP;
    epv="<sip:Carol@Avaya;gr=9012>"?
    Replaces=AW>
Target-Dialog: AW
```

The REFER message can be similar to the messages shown in FIGS. 3A and 3B. The REFER message can include a REFER-To header, e.g., "Refer-To:Carol <sip: AppY@appyIP; epv="<sip:Carol@Avaya;gr=9012>; localtag=C;remotetag=Z;call-id=ZC"; Replaces=AW>," that includes an epv parameter that provides the information about the transfer target (e.g., UA 3, 102*c*). This information is preserved in the REFER message until the REFER message reaches the destination for the message.

The user relation elements 1 and 2, 110*a* and 110*b*, send the REFER message through all sequenced B2BUAs 106/108 involved in the first communication session to inform them that the call structure will change from that shown in FIG. 1B to that shown in FIG. 1C. User relation element 1, 110*a*, routes this REFER message through B2BUA 1*a*, 106*a*, B2BUA 2*a*, 108*a*, and on to user relation element 2, 110*b* in step 428. User relation element 2, 110*b* sends the REFER message to B2BUA 3*a*, 106*c*, B2BUA 4*a*, 108*c*, and then to UA 2, 102*b*, in step 430. The REFER message received by UA 2, 102*b* may appear as follows:

```
REFER sip:Bob@bobIP;
    epv="<sip:Bob@Avaya;gr=5678>"
To: Bob <sip:Bob@Avaya>
From: Alice <sip:Alice@Avaya>
PAI: Alice
Call-ID: XB
Contact: Alice <sip:appX@appxIP;
    epv="<sip:Alice@Avaya;gr=1234>">
Refer-To:Carol <sip:AppY@appyIP;
    epv="<sip:Carol@Avaya;gr=9012>"?
    Replaces=AY>
Target-Dialog: XB
```

To engage the UA 3, 102*c* in a third communication session, UA 2, 102*b* sends an INVITE message with a Replaces header that includes the dialog identifier, e.g., "Replaces=AY", from the Refer-To header. An example of the INVITE message transmitted by UA 2, 102*b* may appear as follows:

```
INVITE Carol sip:AppY@appyIP;
    epv="<sip:Carol@Avaya;gr=9012>"
To: sip:AppY@appyIP
From: Bob <sip:Bob@Avaya>
PAI: Bob
```
-continued
```
Call-ID: XB2
Contact: Bob <sip:Bob@bobIP>
Endpoint-View: <sip:Bob@Avaya;gr=5678>;
    localtag=B2;call-id=XB2
Require: Replaces
Replaces: AY
```

The request URI in the INVITE message is targeted at B2BUA 1*b* 106*b*, e.g., "sip:AppY@appyIP," but the epv parameter contains the AOR/GRUU of UA 3, 102*c*, e.g., "epv="<sip:Carol@Avaya;gr=9012>;localtag=C; remotetag=Z;call-id=ZC">". Thus, the INVITE message would normally redirect the communication session through B2BUA 1*b*, 106*b* because that is the URI of the B2BUA 1*b*, 106*b* closest to UA 1, 102*a*. However, the INVITE message, in the present embodiments, is sent from the UA 2, 102*b* to the user relation element 2, 110*b*, in step 432. The user relation element 2, 110*b*, upon receiving this INVITE message, completes several steps before or as the user relation element 2, 110*b* enters origination processing of the INVITE message. First, the user relation element 2, 110*b* determines if epv information is present in the INVITE message. If there is epv information present, the user relation element 2, 110*b* stores the current R-URI to a "map-URI" header or parameter. Further, the user relation element 2, 110*b* uses the AOR/GRUU from the epv of the INVITE message and, thus, the applications understand for whom the INVITE message is bound. An example of a message created during this processing is as follows:

```
INVITE sip:Carol@Avaya;gr=9012;
    epv="<sip:Carol@Avaya;gr=9012>";
    map-URI=appY@appyIP SIP/2.0
To: sip:AppY@appyIP
From: Bob <sip:Bob@Avaya>
PAI: Bob
Call-ID: XB2
Contact: Bob <sip:Bob@IP>
Endpoint-View: <sip:Bob@Avaya;gr=5678>;
    localtag=B2;call-id=XB2
Require: Replaces
Replaces: AY
Route: appX@appxIP;phase=imsorig
Route: SM@smIP
```

Here, it can be seen that the user relation element 2, 110*b* creates the "map-URI=appY@appyIP; SIP/2.0>" portion of the message and populates the R-URI with the AOR/GRUU (Carol@Avaya;gr=9012) from the epv header. User relation element 2, 110*b* then initiates origination applications B2BUA 3*b*, 106*e* and B2BUA 4*b*, 108*e* for this communication path, which may be different from the termination applications 106*c* and 108*c*.

The user relation element 2, 110*b* may then restore the R-URI from the map-URI field. The user relation element 2, 110*b* then forwards the newly changed INVITE message to user relation element 1, 110*a*, in step 434, to start the unraveling process, of which an example is shown below:

```
INVITE sip:AppY@appyIP;
    epv="<sip:Carol@Avaya;gr=9012>"
To: sip:AppY@appyIP
From: Bob <sip:Bob@Avaya>
PAI: Bob
Call-ID: XZ2
Contact: Bob <sip:appX@appxIP>
```

```
Endpoint-View: <sip:Bob@Avaya;gr=5678>;
    localtag=B2;call-id=XB2
Require: Replaces
Replaces: AY
```

The user relation element 1, 110a now sends the INVITE message through B2BUA 1b, 106b and B2BUA 2b, 108b for unraveling. During unraveling, the B2BUAs 106b and 108b examine the Replaces dialog ID and use that dialog ID to map the R-URI and Replaces dialog ID to be their "next-door neighbor". For example, after B2BUA 106b unravels the INVITE it might appear as shown below:

```
INVITE sip:AppZ@appzIP;
    epv="<sip:Carol@Avaya;gr=9012>"
To: sip:AppZ@appzIP
From: Bob <sip:Bob@Avaya>
PAI: Bob
Call-ID: XZ2
Contact: Bob <sip:appX@appxIP>
Endpoint-View: <sip:Bob@Avaya;gr=5678>;
    localtag=B2;call-id=XB2
Require: Replaces
Replaces: YZ
```

After unraveling B2BUA 1b, 106b and B2BUA 2b, 108b, user relation element 1, 110a can send the INVITE to user relation element 3, 110c, in step 440. In response to receipt of the INVITE message, user relation element 3, 110c may then unravel B2BUA 5a, 106d and B2BUA 6a, 108d. The user relation elements 110 can also determine when to discontinue the unraveling process. Each user relation element 110 can compare the R-URI with the registered Contact URI for the device(s) of the user in the epv header. Thus, when a user relation element 3, 110c finds a match for UA 3, 102c, user relation element 3, 110c may then proceed to term sequencing (e.g., application sequencing for the called party, which is Carol in this example).

When moving from unraveling to term sequencing, the user relation element 3, 110c can conduct some URI mapping. If the UA 3, 102c is not GRUU aware, the Contact URI of UA 3, 102c (which is now the R-URI) may not have an AOR in it. Therefore, user relation element 3, 110c can again store the R-URI in a map-URI header or parameter, promote the URI from the epv parameter, and begin term sequencing. An example message for this process is shown below:

```
INVITE sip:Carol@Avaya;gr=9012;
    epv="<sip:Carol@Avaya;gr=9012>";
    map-URI=Carol@carolIP SIP/2.0
To: sip:Carol@Avaya
From: Bob <sip:Bob@Avaya>
PAI: Bob
Call-ID: XZ2
Contact: Bob <sip:AppX@appxIP>
Endpoint-View: <sip:Bob@Avaya;gr=5678>;
    localtag=B2;call-id=XB2
Require: Replaces
Replaces: ZC
Route: Appz@appzIP;phase=ims-term
```

At this point user relation element 3, 110c will sequence the INVITE through B2BUA 5b, 106f and B2BUA 6b, 108f which may be different than termination applications 106d and 108d.

When the user relation element 3, 110c completes this process, it will restore the original R-URI and finally then send the message to UA 3, 102c. In this process, the user relation element 3, 110c may restore the original R-URI, from the map-URI, and then send the INVITE message to UA 3, 102c, in step 442, which can then send a 200 OK message back to user relation element 3, 110c, in step 444. User relation element 3, 110c can route the 200 OK message through B2BUA 6b, 108f, B2BUA 5b, 106f, and then to user relation element 2, 110b, in step 446. In step 448, user relation element 2, 110b then routes the 200 OK message through B2BUA 4b, 108e and B2BUA 3b, 106e then finally on to UA 2, 102b. In receiving the 200 OK message, UA 2, 102b acknowledges receipt with an ACK message that is routed back to the UA 3, 102c in a reverse manner to the routing of the 200 OK message, in step 448.

After routing of the 200 OK message and any ACK messages, the call structure may appear as in FIG. 1C. Thus, after the INVITE-Replaces completes, UA 3, 102c will send a BYE message to UA 1, 102a, which clears all of the sequenced B2BUAs 106/108 on the communication path established for the second communication session. Additionally, UA 2, 102b can send a sip-frag NOTIFY message back to UA 1, 102a keeping UA 1, 102a apprised of the status of the INVITE-Replaces. Once UA 1, 102a sees that the new dialog has been established, UA 1, 102a can send a BYE message to UA 2, 102b which can clear all of the B2BUAs 106/108 between those two UAs 102a/102b. The changes presented provide the advantage of lowering the amount of processing necessary to handle calls after a transfer, as B2BUAs that are not needed are not in-sequence with the parties in the transferred call. This transfer can be done with more than one person as it is routed through several branches of a call environment to deconstruct or unravel parts of the transferred call.

Figure 5:
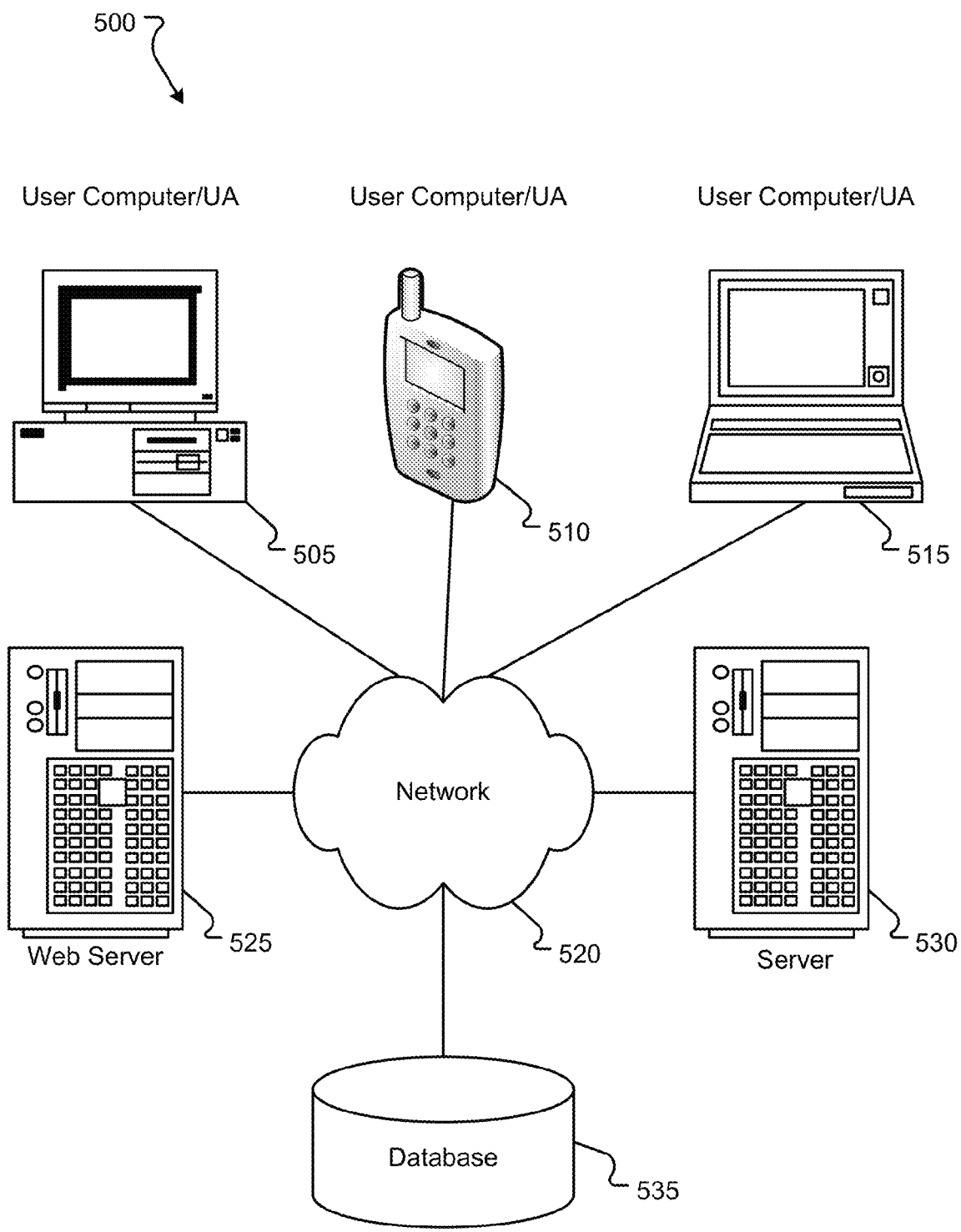
FIG. 5 is a block diagram of an embodiment of a computing environment.

FIG. 5 illustrates a block diagram of a computing environment 500 wherein the systems, devices, servers, software modules, etc. may execute. As such, the system or components described in conjunction with FIG. 5 may be commodity hardware. The computing environment 500 includes one or more user computers 505, 510, and 515. The user computers 505, 510, and 515 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 505, 510, 515 may also have any of a variety of applications, including for example, database client and/or server applications, and web browser applications. Alternatively, the user computers 505, 510, and 515 may be any other electronic device, such as a thin-client computer, Internet-enabled mobile telephone, and/or personal digital assistant, capable of communicating via a network (e.g., the network 520 described below) and/or displaying and navigating web pages or other types of electronic documents. Although the exemplary computing environment 500 is shown with three user computers, any number of user computers may be supported.

Computing environment 500 further includes a network 520. The network 520 can be any type of network familiar to those skilled in the art that can support data communications using any of a variety of commercially-available protocols, including without limitation SIP, TCP/IP, SNA, IPX, AppleTalk, and the like. Merely by way of example, the network 520 maybe a local area network ("LAN"), such as an Ethernet network, a Token-Ring network and/or the like; a wide-area network; a virtB2BUAl network, including without limitation a virtB2BUAl private network ("VPN"); the Internet; an intranet; an extranet; a public switched telephone network ("PSTN"); an infra-red network; a wireless network (e.g., a network operating under any of the IEEE 502.11 suite of protocols, the Bluetooth™ protocol known in the art, and/or any other wireless protocol); and/or any combination of these and/or other networks. The network 520 may be the same or similar to network 105.

The system may also include one or more server computers 525, 530. One server may be a web server 525, which may be used to process requests for web pages or other electronic documents from user computers 505, 510, and 520. The web server can be running an operating system including any of those discussed above, as well as any commercially-available server operating systems. The web server 525 can also run a variety of server applications, including SIP servers, HTTP servers, FTP servers, CGI servers, database servers, Java servers, and the like. In some instances, the web server 525 may publish operations available operations as one or more web services.

The computing environment 500 may also include one or more file and or/application servers 530, which can, in addition to an operating system, include one or more applications accessible by a client running on one or more of the user computers 505, 510, 515. The server(s) 530 may be one or more general purpose computers capable of executing programs or scripts in response to the user computers 505, 510 and 515. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 530 may also include database servers, including without limitation those commercially available from Oracle, Microsoft, Sybase™, IBM™ and the like, which can process requests from database clients running on a user computer 505.

The web pages created by the web application server 530 may be forwarded to a user computer 505 via a web server 525. Similarly, the web server 525 may be able to receive web page requests, web services invocations, and/or input data from a user computer 505 and can forward the web page requests and/or input data to the web application server 530. In further embodiments, the server 530 may function as a file server. Although for ease of description, FIG. 5 illustrates a separate web server 525 and file/application server 530, those skilled in the art will recognize that the functions described with respect to servers 525, 530 may be performed by a single server and/or a plurality of specialized servers, depending on implementation-specific needs and parameters.

The computing environment 500 may also include a database 535 or multiple databases. The database 535 may reside in a variety of locations. By way of example, database 535 may reside on a storage medium local to (and/or resident in) one or more of the computers 505, 510, 515, 525, 530. Alternatively, it may be remote from any or all of the computers 505, 510, 515, 525, 530, and in communication (e.g., via the network 520) with one or more of these. In a particular set of embodiments, the database 535 may reside in a storage-area network ("SAN") familiar to those skilled in the art. Similarly, any necessary files for performing the functions attributed to the computers 505, 510, 515, 525, 530 may be stored locally on the respective computer and/or remotely, as appropriate. In one set of embodiments, the database 535 may be a relational database, such as Oracle 10i™, that is adapted to store, update, and retrieve data in response to SQL-formatted commands.

Figure 6:
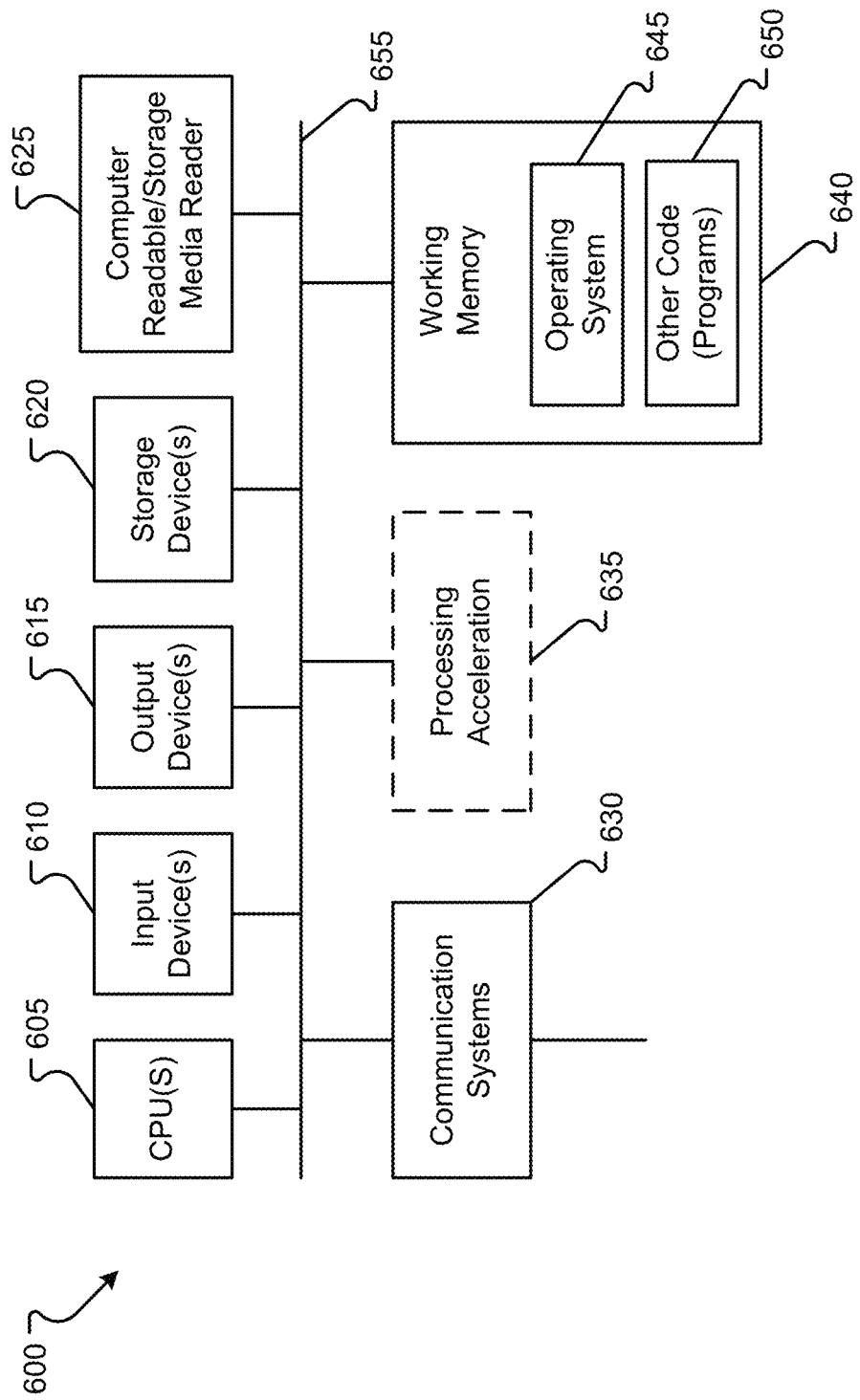
FIG. 6 is a block diagram of an embodiment of a computer.

FIG. 6 illustrates one embodiment of a computer system 600 upon which the systems, devices, servers, software modules, etc. described herein may be deployed or executed. The computer system 600 is shown comprising hardware elements that may be electrically coupled via a bus 655. The hardware elements may include one or more central processing units (CPUs) 605; one or more input devices 610 (e.g., a mouse, a keyboard, etc.); and one or more output devices 615 (e.g., a display device, a printer, etc.). The computer system 600 may also include one or more storage devices 620. By way of example, storage device(s) 620 may be disk drives, optical storage devices, solid-state storage devices such as a random access memory ("RAM") and/or a read-only memory ("ROM"), which can be programmable, flash-updateable and/or the like.

The computer system 600 may additionally include a computer-readable storage media reader 625; a communications system 630 (e.g., a modem, a network card (wireless or wired), an infra-red communication device, etc.); and working memory 640, which may include RAM and ROM devices as described above. In some embodiments, the computer system 600 may also include a processing acceleration unit 635, which can include a DSP, a special-purpose processor, and/or the like.

The computer-readable storage media reader 625 can further be connected to a computer-readable storage medium, together (and, optionally, in combination with storage device (s) 620) comprehensively representing remote, local, fixed, and/or removable storage devices plus storage media for temporarily and/or more permanently containing computer-readable information. The communications system 630 may permit data to be exchanged with the network and/or any other computer described above with respect to the computer system 600. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 640, including an operating system 645 and/or other code 660. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figures. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description langB2BUAges, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the concepts may be otherwise variously embodied and employed, and that the appended claims are intended to be construed to include such variations, except as limited by the prior art.

What is claimed is:

1. A method for facilitating a transfer of a User Agent (UA) involved in a first communication session to a different communication session, the method comprising:
   receiving, by a processor, a first message comprising a unique identifier inserted into at least one portion of the first message, the at least one portion comprising at least one of a header and a parameter of the first message, the first message having traversed at least one Back-to-Back UA (B2BUA);
   extracting, by the processor, the unique identifier from at least one portion of an endpoint view header of the first message;
   inserting, by the processor, the extracted unique identifier from the at least one portion of the endpoint view header into a Contact Uniform Resource Identifier (URI) of the first message; and
   sending, by the processor, the first message with the inserted unique identifier.

2. The method of claim 1, wherein the first message is at least one of an INVITE message and 200 OK message.

3. The method of claim 1, wherein the unique identifier comprises a Globally Routable UA URI (GRUU) that identifies an endpoint involved in the first communication session and an Address of Record (AOR) for a user of the first communication device.

4. The method of claim 3, wherein the at least one portion of the endpoint view header of the first message further comprises an endpoint view parameter.

5. The method of claim 1, further comprising:
   receiving a second message, the second message corresponding to an out-of-dialog INVITE-Replaces message;
   determining that the second message comprises endpoint view information embedded in a Request-URI (R-URI) of the second message; and
   promoting the unique identifier to be a primary URI in the R-URI of the second message.

6. The method of claim 5, further comprising:
   prior to promoting the unique identifier to be the primary URI of the second message, storing an original R-URI value in a place-holding header or parameter of the second message;
   using the unique identifier to route the second message and sequence origination applications for the different communication session; and
   after the origination applications have been sequenced for the different communication session, restoring the original R-URI value from the place-holding header or parameter back to the primary R-URI of the second message.

7. The method of claim 6, further comprising:
   receiving the second message after the origination applications have been sequenced for the different communication session; and
   unraveling each application sequenced for the first communication session, wherein unraveling each application comprises having each application sequenced for the first communication session remove itself from a communication path of the different communication session.

8. The method of claim 7, wherein each application sequenced for the first communication session forwards the second message without performing a record route function and wherein each application sequenced for the first communication session uses a dialog map to modify the R-URI and Replaces header of the second message before proxying the second message.

9. The method of claim 7, wherein each application sequenced for the first communication session compares the R-URI of the second message with a registered Contact URI for devices associated with the unique identifier.

10. The method of claim 6, wherein the place-holding header or parameter comprises a map-URI.

11. The method of claim 6, further comprising:
   receiving the second message after the origination applications have been sequenced for the different communication session;
   directly sending the second message to a user relation element associated with a transfer target.

12. A server configured to facilitate the transfer of a User Agent (UA) from a first communication session to a different communication session, the server comprising:

a user relation element, executed by a processor, configured to receive a first message during the first communication session or during establishment of the first communication session, the first message having traversed at least one Back-to-Back UA (B2BUA), the user relation element being further configured to extract a unique identifier from a portion of an endpoint view header of the first message and insert the extracted unique identifier from the portion of the endpoint view header into a Contact Uniform Resource Identifier (URI) of the first message and send the first message with the inserted unique identifier.

13. The server of claim 12, wherein the unique identifier comprises a Globally Routable UA URI (GRUU).

14. The server of claim 13, wherein the first message is an INVITE message and wherein the GRUU identifies a first UA that transmitted the INVITE message and an Address of Record (AOR) for a user of the first UA.

15. The server of claim 14, wherein the user relation element is further configured to receive a 200 OK response to the INVITE message, extract a second unique identifier from the 200 OK response and insert the extracted second unique identifier into a Contact URI of the 200 OK response, the second unique identifier comprising a GRUU that identifies a second UA that received the INVITE message and transmitted the 200 OK response as well as an AOR for a user of the second UA.

16. The server of claim 12, wherein the user relation element is further configured to receive a second message corresponding to an out-of-dialog INVITE-Replaces message, determine that the second message comprises endpoint view information embedded in a Request-URI (R-URI) of the second message, and promote the unique identifier to be a primary URI in the R-URI of the second message.

17. The server of claim 16, wherein the user relation element is further configured to store an original R-URI value in a place-holding header or parameter of the second message prior to promoting the unique identifier to be the primary URI, sequence origination applications for the different communication session, restore the original R-URI value from the place-holding header or parameter back to the primary R-URI of the second message, and then perform one of the following: (i) transmit the second message to a user relation element associated with a transferring entity so that sequenced applications of the first communication session can remove themselves from a communication path of the different communication session and (ii) transmit the second message to a user relation element associated with a transfer target.

18. A computer program product including computer executable instructions stored onto a non-transitory computer readable medium which, when executed by a processor of a computer, causes the computer to perform a method that facilitates transfer of a User Agent (UA) from a first communication session to a different communication session, the instructions comprising:
   instructions configured to analyze a first Session Initiation Protocol (SIP) message that has traversed at least one Back-to-Back UA (B2BUA) and determine that the first SIP message comprises a unique identifier inserted into at least one portion of the first SIP message, the at least one portion comprising at least one of an endpoint view header and an endpoint view parameter of the first SIP message;
   instructions configured to extract the unique identifier from the at least one portion of the first SIP message;
   instructions configured to insert the extracted unique identifier into a Contact Uniform Resource Identifier (URI) of the first SIP message; and
   instructions configured to send the first SIP message with the inserted unique identifier.

19. The computer program product of claim 18, wherein the unique identifier comprises an Address of Record (AOR)-based Globally Routable UA URI (GRUU) that identifies at least one UA and a user of the at least one UA involved in the first communication session, wherein the first message corresponds to at least one of an INVITE message and 200 OK message.

20. The computer program product of claim 18, wherein the first SIP message is at least one of an INVITE message and 200 OK message.

21. The computer program product of claim 18 further comprising:
   instructions configured to receive a second SIP message, the second SIP message corresponding to an out-of-dialog INVITE-Replaces message;
   instructions configured to determine that the second SIP message comprises endpoint view information embedded in a Request-URI (R-URI) of the second SIP message; and
   instructions configured to promote the unique identifier to be a primary URI in the R-URI of the second SIP message.

* * * * *